June 4, 1929.	C. KIRWER	1,716,140
METHOD OF MAKING GAS TIGHT SEALS BETWEEN GLASS AND METAL
Filed Sept. 28, 1923   2 Sheets-Sheet 1

WITNESSES:
R. J. Butler.
S. M. Pineles.

INVENTOR
Christ Kirwer.
BY
Wesley G. Carr
ATTORNEY

June 4, 1929.   C. KIRWER   1,716,140

METHOD OF MAKING GAS TIGHT SEALS BETWEEN GLASS AND METAL

Filed Sept. 28, 1923   2 Sheets-Sheet 2

WITNESSES:
R. J. Butler.
S. M. Pineles.

INVENTOR
Christ Kirwer.
BY
Wesley G. Carr
ATTORNEY

Patented June 4, 1929.

1,716,140

UNITED STATES PATENT OFFICE.

CHRIST KIRWER, OF EAST PITTSBURGH, PENNSYLVANIA, ASSIGNOR TO WESTINGHOUSE ELECTRIC & MANUFACTURING COMPANY, A CORPORATION OF PENNSYLVANIA.

METHOD OF MAKING GAS-TIGHT SEALS BETWEEN GLASS AND METAL.

Application filed September 28, 1923. Serial No. 665,415.

My invention relates to space current devices and it has particular relation to gastight seals which are employed in combined glass and metal vessels used for such devices and which are designed to maintain a high degree of vacuum.

One object of my invention is to provide a seal of the above-described character which shall be mechanically strong and dependable.

A more particular object of my invention is to provide combined glass and metal vessels for evacuated, or in general, gas tight, space current devices.

Another object of my invention is to provide a seal of the above-described character which shall be particularly well adapted for making gas-tight connections between tubular glass members and tubular metal members, and wherein the end portion of the glass is folded over both sides of the end portion of the metal tube.

A further object of my invention is to provide tubular metal members having a glass flange welded to the end portion of the tube and folded over the edge thereof.

A still further object of my invention is to provide a method of making strong and highly efficient gas-tight seals between glass and metal.

The growing industrial application of vacuum-tube devices calls for a reliable, simple and readily applicable seal between glass and metal which shall be capable of preserving the high vacuum of a closed container for an indefinite period. The seal is also required to be mechanically strong and capable of withstanding rough usage and handling, without damage.

Heretofore, in order to produce an airtight seal between a glass tube and a metal tube, the end portion of the metal tube has been formed into a knife-like edge and the glass tube has been welded to the inner surface of the knife-like end portion. The small thickness of the welded metal portion permits the metal to expand and contract in accordance with the expansion and contraction of the glass surface to which it is welded without breaking away therefrom.

In the practical application of the above-described construction, it has been found that copper is very well adapted for making seals of such character, on account of its high ductility and plasticity. Such seals have withstood the requirements of high vacuum to a fairly high degree.

I have found that by overlapping the end portion of the glass tube over the edge of the metal tube and welding it to both sides of the knife-like end portion, a glass-to-metal joint may be obtained which is superior, in its gastight properties, to any other joint known heretofore and at the same time it has a degree of ruggedness and mechanical strength which is lacking in all prior structures.

I have further found that the doubly overlapping glass-metal joint affords a very simple and practical method for making glass-to-metal joints of the above-described character. In practicing my invention, I place a short folded tubular glass portion over the knife-like end portion of the metal tube and weld it to both sides thereof. As the glass-to-metal joint requires a very intimate contact between the glass and the surface of the metal tube, which is ordinarily obtained by working and rolling the heated, soft glass onto the surface of the metal, the simple and convenient expedient of a folded glass portion welded in the form of a flange over the end portion of the metal tube greatly facilitates the making of the joint and ensures a better and more uniform weld between the glass and the metal. The glass tube proper is then welded to the glass flange, preferably at the portion opposite the knife-like edge.

For a better understanding of my invention reference may be had to the accompanying drawing, wherein Figure 1 is a sectional view of a mercury arc rectifier made according to my invention;

Figures 1, 2:
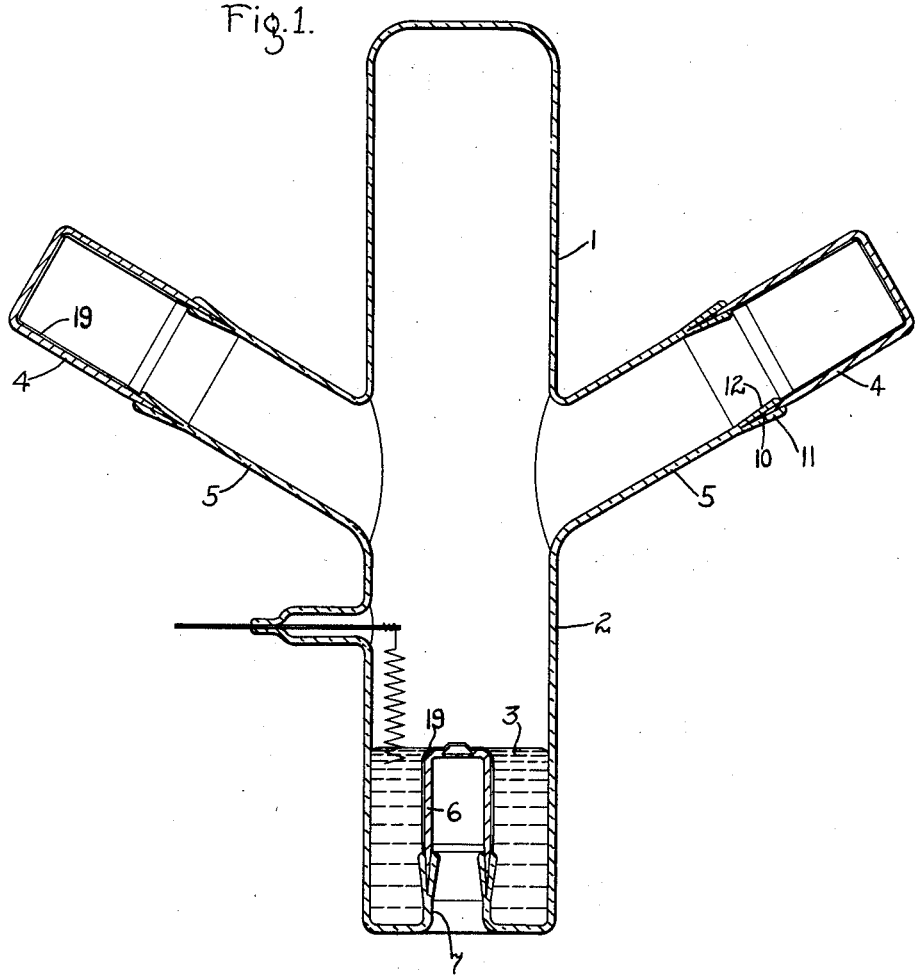
Fig. 2 is an enlarged sectional view of a glass-metal seal used in the rectifier shown in Fig. 1.

In Fig. 1, a mercury arc rectifier comprises a glass vessel 1 having a depending portion 2 arranged as a container for mercury 3 acting as the cathode. Two metal electrodes or anodes 4 of cup shape are welded or sealed to tubular side arms 5 respectively of the glass vessel 1. The contact with the mercury cathode is accomplished by means of a contact member 6 of a cup-shape which is welded to a reentrant tubular member 7 of the depending portion 2 of the glass vessel.

The metallic members constituting the cathode and the anodes respectively are sealed to the glass by means of gas tight welds mentioned hereinbefore. In making a rectifier, I first seal the metal electrode, the anode 4 for instance, to the adjacent tubular glass member 5 in the manner described hereinafter and fuse thereupon the combined glass-metal structure so obtained to the main body of the vessel 1.

In Fig. 2 are shown in detail the essential elements of the seal between the anode 4 and the tubular adjoining glass member 5. The anode 4 is made of copper and has its open tubular end portion formed into a knife-like edge 10. The tubular glass member 5 is disposed in end-to-end relation to the knife-like edge 10 of the metal tube and has two wall portions 11 and 12 which are folded over both sides of the end portion 10 of the tube, the glass walls 11 and 12 being welded to the metal.

The knife-like end portion 10 of the metal tube is thus held firmly from both sides thereof by the adjacent glass walls 11 and 12 and the delicate thin edge 10 upon which the gas-tight properties of the seal to a very high degree depend, is absolutely protected against mechanical damage and also against damage resulting from the exposure of the edge to chemical and other influences. My invention secures, therefore, the absolute protection of the most sensitive part of the seal.

Figure 3:
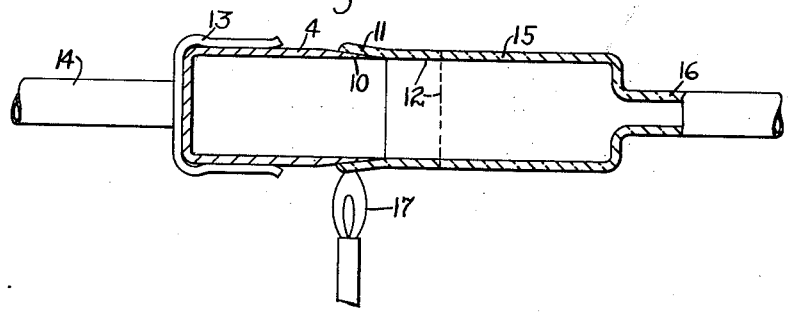
Fig. 3 is a sectional view illustrating one step in making a seal between the metal electrode and the glass member of the rectifier shown in Fig. 1.

In Fig. 3 is illustrated the first step in making of the improved weld or seal. The metal cup 4 is held in a suitable fixture 13 having a projecting handle 14. A glass tube 15 having an end portion adapted to constitute one wall 11 of the seal is fitted over the knife-like end portion of the electrode. The other end of the glass tube 15 has an extension 16 for facilitating the handling of the same during the sealing operation.

The end portions 10 and 11 of the metal and of the glass member, respectively, are at first preheated in a hot gas flame 17 and the glass portion 11 is thereupon carefully fitted over the metal portion. To avoid un-uniform expansion of the glass and the metal, the heated members 15 are uniformly rolled in the flame during the entire operation. The glass portion is carefully worked and rolled upon the metal surface by means of a graphite or metal plate, until the metal is fully wetted by the glass. I then sever, in the gas flame, the excess of the projecting glass member 15 leaving only a short portion 12 projecting beyond the knife-like edge.

Figure 4:
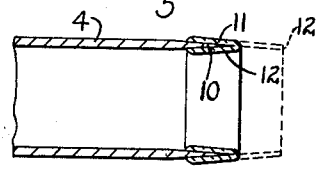
Figs. 4, 5 and 6 are similar views illustrating further steps in making the seal.

The projecting portion 12 is of just sufficient length to constitute the inner wall of the seal and is folded over the inner surface of the tubular end portion 10. (Fig. 4.) The folded over portion is then worked and rolled upon the inner metal surface by means of a graphite or metal rod of suitable dimensions as was the outer wall 11. The entire operation is preferably carried out while keeping the end portion of the metal tube at a high temperature.

Figure 5:
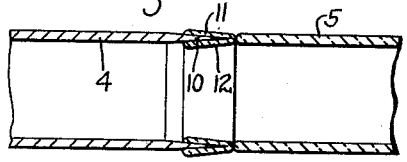
Figure 6:
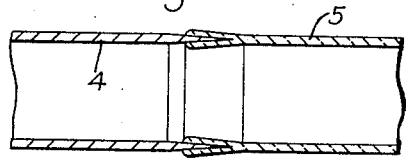

The metal electrode is now provided with a doubly folded glass flange, as shown in Fig. 5, and is ready to be sealed to the glass tube 5, either while it is still hot or at any later time. The final product is shown in Fig. 6. In quantity production, the glass flange 11 and 12 is conveniently welded to the metal in one sequence of operations and the glass tube 5 is sealed thereto in another operation at any convenient subsequent time.

Figure 7:
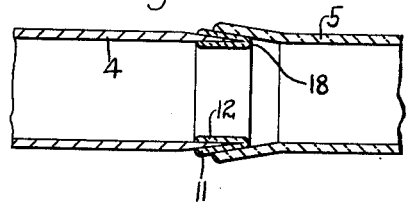
Fig. 7 is a view, similar to Fig. 6, showing a modification of my invention.

Instead of welding the glass tube to the extreme end-portion 18 of the glass flange, as shown in Fig. 5, the tube may be welded to the side portion thereof as shown in Fig. 7.

Figure 8:
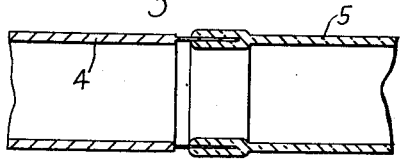
Figs. 8 and 9 are similar views illustrating two further modifications of my invention.
Figure 9:
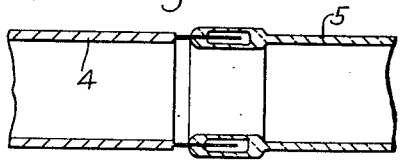

By using a metal which is sufficiently plastic to yield to the force exerted thereupon by the adjacent glass walls during temperature variations, such properties being possessed by soft grades of copper for instance, I may dispense with the thin knife-like end portion and weld the glass directly to an end portion of relatively great thickness, as shown in Fig. 8. I may also leave the end portion of the metal tube free from direct contact with the glass flange and weld the two sides of the folded glass flange to the metal tube at a short distance away from the edge thereof, as shown in Fig. 9.

In order to protect the copper electrodes from the detrimental action of mercury, I protect the same by means of a protective coating 19 of iron and nickel as described and claimed in the copending application of D. Ulrey, Serial No. 665,407 filed September 28, 1923, and assigned to the Westinghouse Electric & Manufacturing Company.

My invention is susceptible of various other modifications and changes without departing from the spirit thereof and I desire that only such limitations shall be placed thereon as are imposed by the prior art or set forth in the appended claims.

I claim as my invention:

1. The method of providing a glass flange upon an end portion of a metallic wall which consists in welding a portion of a substantially straight glass wall to said thin end portion, folding said glass wall over the edge of said end portion and then welding the folded-over portion to the other side of said end portion.

2. The method of uniting a glass sheet to a metal sheet in edge-to-edge relation which consists in fusing a glass member to each face of the metal sheet with the glass member extending around the edge of the metal sheet in a fold over the edge of the metal sheet, and then fusing the glass sheet to said folded glass member.

3. The method of uniting a glass sheet to a metal sheet in edge-to-edge relation which consists in fusing a glass member to each face of the metal sheet with the glass member extending around the edge of the metal sheet in a folded edge over the edge of the metal sheet, and then fusing the glass sheet to the folded edge of said folded glass member.

4. The method of uniting a glass sheet and a metal sheet, which consists in forming the end of the metal sheet into a tapered knife-like edge, fusing a strip of glass to one side of said knife-like edge, a portion of said strip projecting beyond said edge, bending and folding the projecting portion of said strip over said edge, fusing the folded-over portion of said strip to the other side of said knife-like edge and then fusing said glass sheet to the folded glass strip.

5. The method of uniting a tubular glass member and a tubular metal member which consists in folding an intermediate member of glass over the end portion of said tubular metal member, fusing said glass intermediate member to both sides of said end portion and then fusing said tubular glass member to said folded glass intermediate member.

6. The method of uniting a metal tube to a glass tube which consists in forming the end of said metal tube into a knife-like edge, fusing a portion of a tubular glass member to one side of said knife-like end portion, a portion of said tubular glass member extending beyond said edge, bending and folding said tubular member over said edge, fusing said folded-over portion to the other side of said knife-like end portion and then fusing said glass tube to said folded tubular glass member.

7. The method of uniting a metal tube to a glass tube which consists in fusing a portion of a tubular glass member to one side of the end portion of said metal tube, a portion of said tubular glass member extending beyond said end portion, bending and folding said tubular member over said end portion, fusing said folded-over portion to the other side of said end portion and then fusing said glass tube to said folded tubular member.

8. The method of uniting a metal tube to a glass tube which consists in forming the end of said metal tube into a knife-like edge, fitting a tubular glass member over said end portion, fusing said glass member to the outer surface of said knife-like end portion, a portion of said glass member projecting beyond the edge thereof, bending and folding said projecting portion over said edge, fusing the folded-over portion to the inner surface of said knife-like end portion, and then fusing the glass tube to the bend of said folded over tubular glass member.

9. The method of uniting a metal tube to a glass tube which consists in forming the end of said metal tube into a knife-like edge, fitting a tubular glass member over said portion, heating said metal tube and said tubular glass member until the glass is softened, rolling and fusing said softened glass member onto the outer surface of said end portion, bending a projecting portion of the softened tubular glass member over the edge of said end portion and folding it thereover, rolling and fusing said folded-over portion onto the inner surface of said end portion and then fusing said glass tube to a portion of said tubular glass member.

In testimony whereof, I have hereunto subscribed my name this 25th day of September, 1923.

CHRIST KIRWER.